(12) United States Patent
Zilka

(10) Patent No.: US 10,004,257 B2
(45) Date of Patent: Jun. 26, 2018

(54) CIGAR HOLDER FOR GOLF CART

(76) Inventor: Wayne Zilka, Clarkston, MI (US)

( * ) Notice: Subject to any disclaimer, the term of this patent is extended or adjusted under 35 U.S.C. 154(b) by 1189 days.

(21) Appl. No.: 13/602,698

(22) Filed: Sep. 4, 2012

(65) Prior Publication Data

US 2014/0060551 A1   Mar. 6, 2014

(51) Int. Cl.
*A24F 19/00* (2006.01)
*A24F 13/22* (2006.01)
*B60N 3/12* (2006.01)

(52) U.S. Cl.
CPC ............... *A24F 13/22* (2013.01); *B60N 3/12* (2013.01)

(58) Field of Classification Search
CPC .................................. B60N 3/12; A24F 13/22
See application file for complete search history.

(56) References Cited

U.S. PATENT DOCUMENTS

| 867,250 | A | * | 10/1907 | Davis | A24F 19/005 |
|---|---|---|---|---|---|
| | | | | | 131/242.6 |
| 3,278,203 | A | * | 10/1966 | Snyder | 285/138.1 |
| 5,524,646 | A | | 6/1996 | Reich | |
| 5,706,832 | A | | 1/1998 | Gold | |
| 5,842,481 | A | | 12/1998 | King | |
| D408,097 | S | | 4/1999 | Heydt | |
| 6,050,268 | A | | 4/2000 | San Filippo | |
| 2009/0032035 | A1 | | 2/2009 | Thorpe | |
| 2010/0071737 | A1 | * | 3/2010 | Gourdine et al. | 135/16 |
| 2010/0139673 | A1 | * | 6/2010 | Miller | A24F 13/22 |
| | | | | | 131/187 |

FOREIGN PATENT DOCUMENTS

WO   WO 2008/055075   5/2008

* cited by examiner

*Primary Examiner* — Michael H Wilson
*Assistant Examiner* — Dionne W Mayes
(74) *Attorney, Agent, or Firm* — Harness, Dickey & Pierce, P.L.C.

(57) ABSTRACT

A cigar holder assembly adapted for use with a golf bag or golf cart. The cigar holder assembly includes a clamp, a cigar tube, and a multi-positional swivel connector configured to permit adjustment of the position of the cigar tube relative to the clamp.

16 Claims, 5 Drawing Sheets

CIGAR HOLDER FOR GOLF CART

FIELD

The present disclosure relates generally to cigar holders and, more particularly, to an integrated cigar holder and clamp assembly that is adapted for use with a golf cart.

BACKGROUND

This section provides background information related to the present disclosure which is not necessarily prior art.

A round of golf played with friends is a pleasurable experience. As part of this experience, it is well known that many golfers enjoy smoking cigars. To avoid losing a cigar, or the need to place a cigar on the ground, various cigar holding devices have been developed that can be mounted to the golf bag or the golf cart. While such devices are adequate for their intended purpose, a need still exists to develop improved cigar holding devices that provide enhanced convenience.

SUMMARY

This section provides a general summary of the disclosure, and is not a comprehensive disclosure of its full scope or all of its features.

It is an aspect of the present disclosure to provide a cigar holder assembly that is adapted for use with a golf bag or a golf cart.

It is another aspect of the present disclosure to provide a cigar holder assembly that interconnects a cigar tube and a clamp with a swivel-type connector.

These and other aspects of the present disclosure are provided by a cigar holder assembly having a clamp, a cigar tube and a multi-positional swivel connector that is adapted to moveably interconnect the cigar tube to the clamp. The clamp is configured to be releaseably attachable to a structural component of a golf bag or a golf cart. The cigar tube is configured to hold a cigar. Furthermore, the swivel connector is configured to permit adjustment of the angular position of the cigar tube relative to the clamp so as to provide a preferred orientation of the cigar within the cigar tube.

In accordance with one exemplary embodiment of the cigar holder assembly of the present disclosure, the swivel connector includes a male member extending from one of the clamp and the cigar tube, a female member extending from the other one of the clamp and the cigar tube, and an inter-digitated locking arrangement. The female member surrounds the male member so as to define a rotational axis to facilitate rotary (i.e. swivel) movement of the cigar tube relative to the clamp. The inter-digitated locking arrangement includes first projections formed on the male member that are engageable with second projections formed on the female member, and a fastener for releaseably coupling the male member to the female member following inter-digitated (i.e., meshed) engagement of adjacent first and second projections. The number of the first and second projections and the spacing therebetween defines a plurality of pre-defined swivel position. Accordingly, the cigar tube can be rotated relative to the clamp between a number of swivel positions with the fastener adapted to maintain the cigar tube in the selected swivel position.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 1:
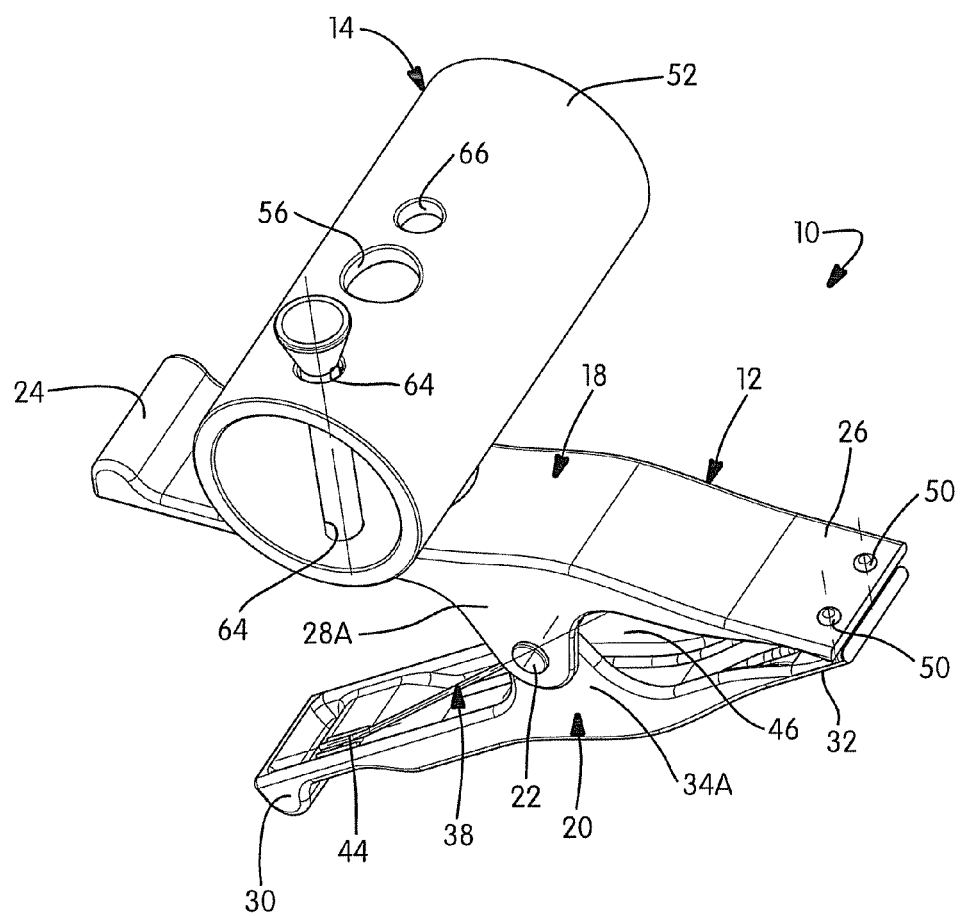
FIG. 1 is a perspective view of a cigar holder assembly constructed in accordance with the teachings of the present disclosure.
Figure 2:
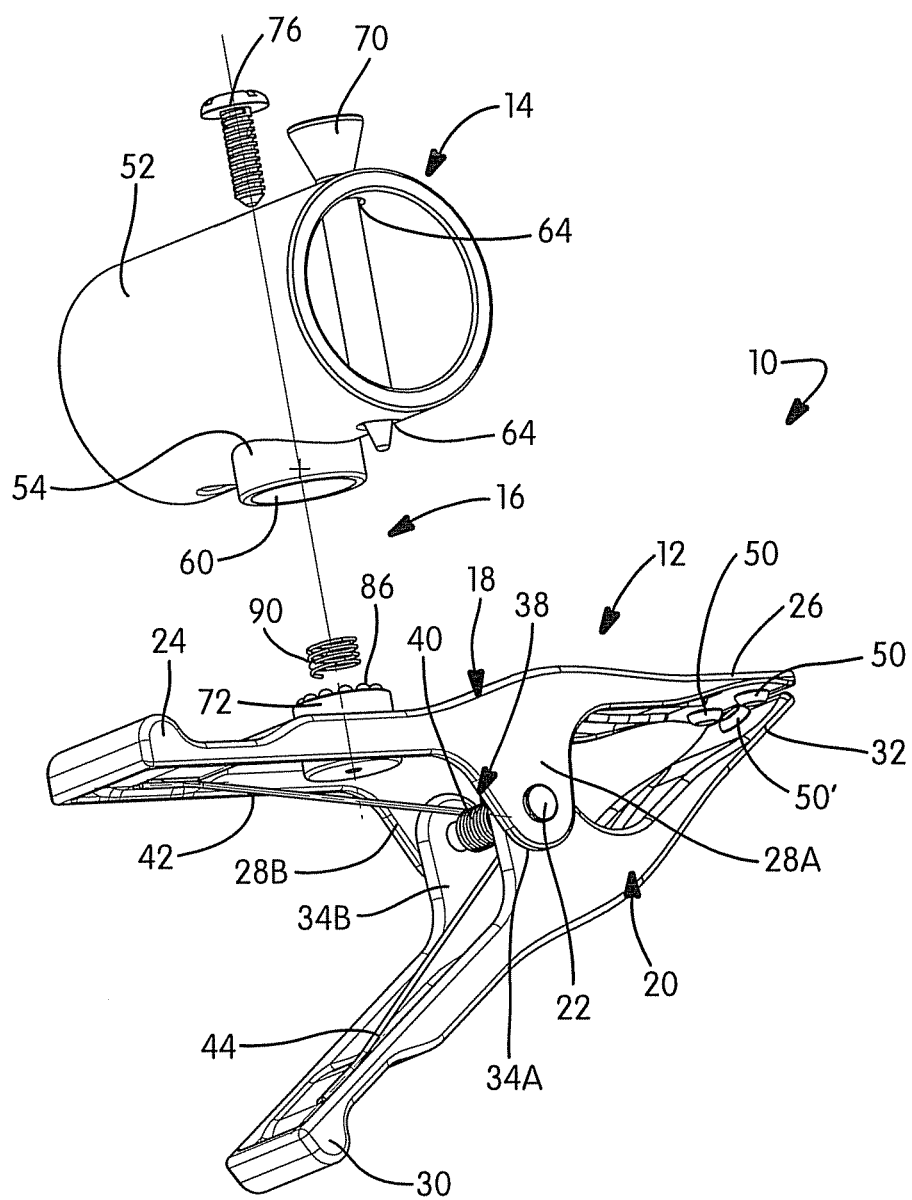
FIG. 2 is an exploded perspective view of the cigar holder assembly shown in FIG. 1.
Figure 3:
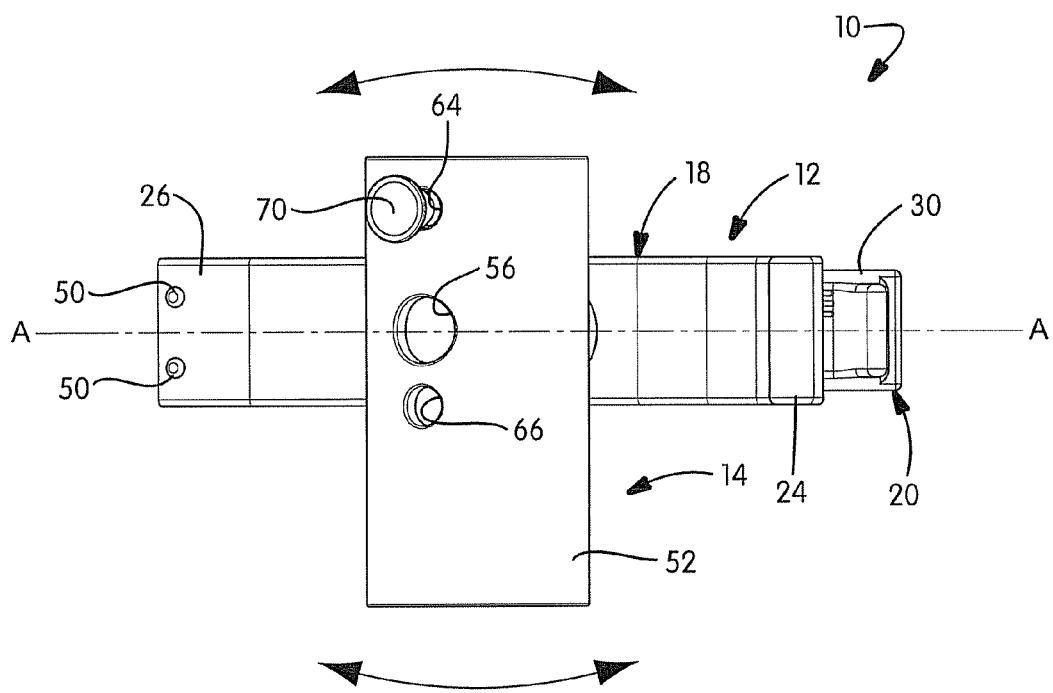
FIG. 3 is a top view of the cigar holder assembly.
Figure 4:
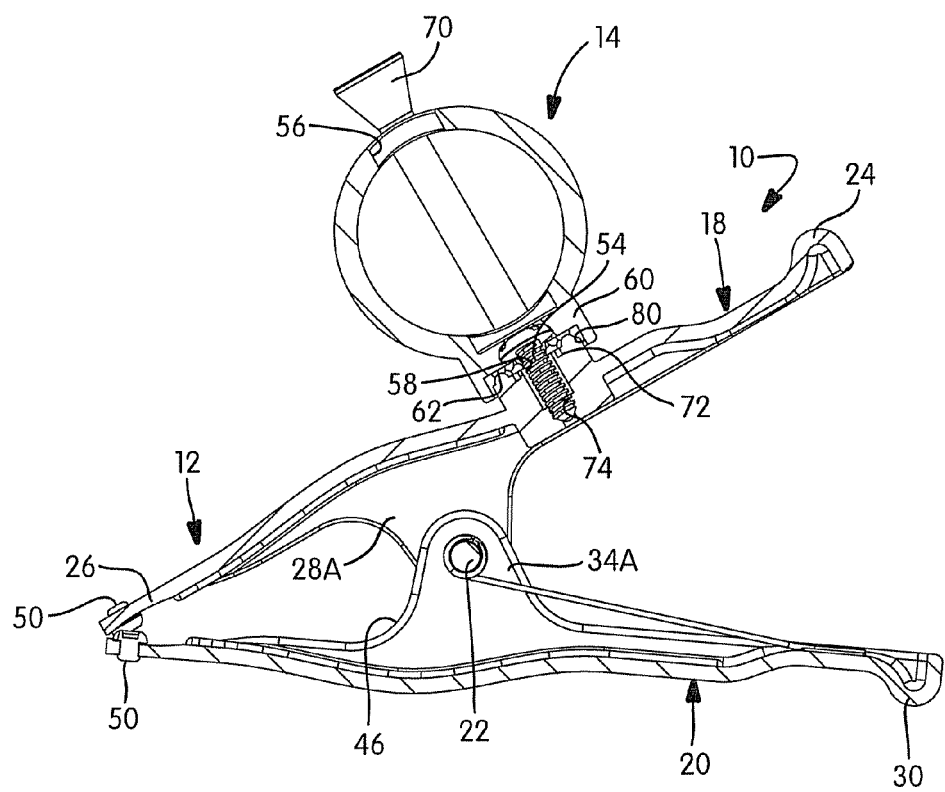
FIG. 4 is a sectional view of the cigar holder assembly taken generally along line A-A of FIG. 3.
Figure 5:
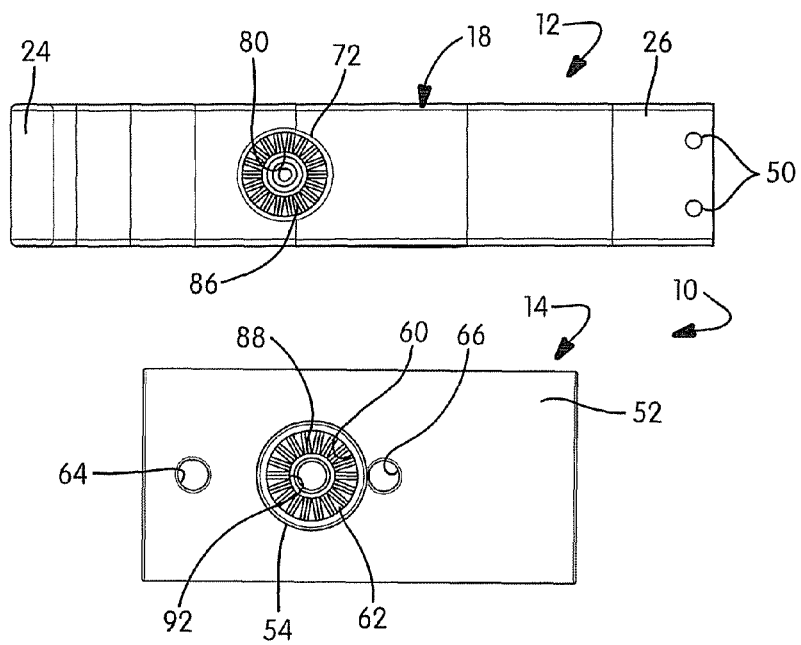
Figure 6:
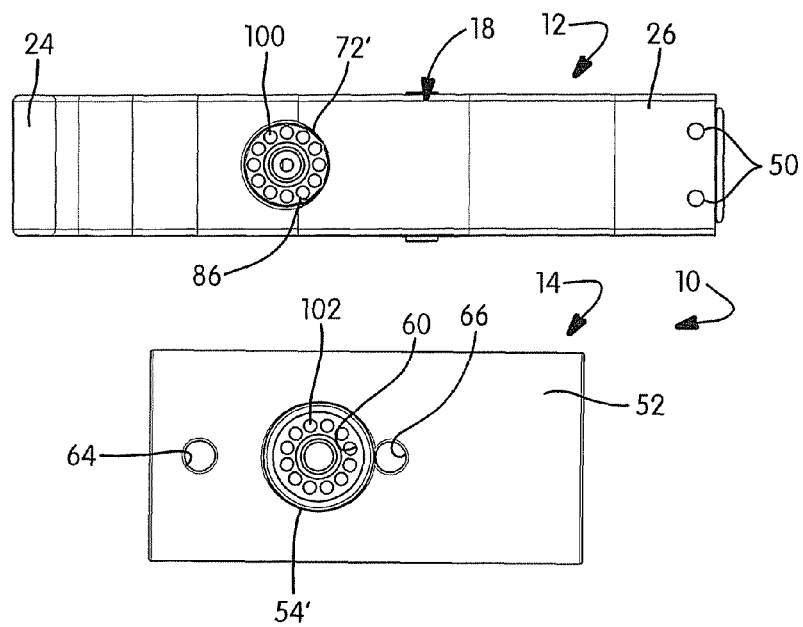

FIG. 5 is an unassembled view of the cigar holder assembly of the present disclosure illustrating the multi-positional swivel connector arrangement between the clamp and the cigar tube; and FIG. 6 is an unassembled view of the cigar holder assembly of the present disclosure illustrating an alternative configuration for the multi-positional swivel connector arrangement between the clamp and the cigar tube.

Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

With reference now to the drawings, a cigar holder assembly 10 constructed in accordance with the present disclosure is shown to include a clamp 12 and a cigar tube 14 that are operably connected by a multi-positional swivel connector 16. Clamp 12 is configured and adapted to be removeably attached/connected to a structural component of a golf cart (both the motorized cart and wheeled pull cart varieties). Clamp 12 can include a first or upper arm 18 that is pivotally connected to a second or lower arm 20 via a pivot post 22. First arm 18 can include a first end 24 defining a first handle portion and a second end 26 defining a first gripper portion. A pair of laterally-spaced first flanges 28A, 28B extends transversely from opposite edges of an intermediate portion of first arm 18. Second arm 20 can also include a first end 30 defining a second handle portion and a second end 32 defining a second gripper portion. A pair of laterally-spaced second flanges 34A, 34B extends transversely from opposite edges of an intermediate portion of second arm 20. First flanges 28A, 28B are configured to overlap second flanges 34A, 34B.

Pivot post 22 is shown to extend through flanges 28A, 28B of first arm 18 and flanges 34A, 34B of second arm 20 so as to align the corresponding first and second ends of the first and second arms of clamp 12 for pivotal movement. A return spring 38 has a coil portion 40 surrounding pivot post 22, a first leg portion 42 biasedly engaging first end 24 of first arm 18, and a second leg portion 44 biasedly engaging first end 30 of second arm 20. Return spring 38 is configured to normally position clamp 12 in a "clamped" position (shown) whereat the handle portions of the first and second arms are separated and the gripper portions thereof are engaged. In its clamped position, first leg 18 and second leg 20 of clamp 12 define an enclosed retention chamber 46 between their respective flanges and gripper portions. Chamber 46 is configured to engage and exert a clamping force on the structural component of the golf cart. As will be appreciated, clamp 12 can be moved to a "released" position for opening retention chamber 46 by applying an inward force to the handle portions of arms 18, 20 to separate and permit removal of clamp 12 from the structural component of the golf cart. As seen, the gripper portions of arms 18, 20 can each include at least one rubber gripper insert. Specifically, a pair of gripper inserts 50 is attached to first arm 18 while a single gripper insert 50' is attached to second arm 20.

Cigar tube 14 can include a tubular body section 52 and a tubular connector boss 54 extending outwardly from body section 52. A first mounting aperture 56 extending through body section 52 is aligned with second mounting aperture 58 extending through connector boss 54. Connector boss 54 has an internal cavity defined by cylindrical sidewall 60 and an end wall 62. Body section 52 can further include an aligned pair of first retention bores 64 and an aligned pair of second retention bores 66 located on opposite sides of aligned mounting apertures 56 and 58. A golf tee 70 is shown extending between first retention bores 64, the purpose of which will be detailed hereinafter.

Connector boss 54 is configured to be mounted on and surround a connector post 72 extending outwardly from first arm 18. Connector post 72 can be formed integrally with first arm 18 or, in the alternative, can be rigidly secured to first arm 18. Connector post 72 can include a threaded bore 74 that is alignable with second mounting aperture 58 when cigar tube 14 is installed onto clamp 12, both of which are adapted to receive a threaded mounting screw 76. First mounting aperture 56 is sized to permit screw 76 to pass therethrough to facilitate insertion of screw 76 into second mounting aperture 58 and threaded bore 74. Connector post 72 further includes an annular groove 80 surrounding threaded bore 74.

Multi-positional swivel connector 16 is operably associated with connector boss 54 and connector post 72 to permit rotary movement and positioning of cigar tube 14 relative to clamp 12 in one of a plurality of distinct swivel positions. In particular, swivel connector 16 can include a plurality of radially-extending teeth 86 formed on the distal end of connector post 72 that are adapted to engage and inter-digitate with a plurality of radially-extending teeth 88 formed on end wall 62 within the internal cavity of connector boss 54. A coil spring 90 can be retained within annular groove 80 in connector post 72 and an aligned annular groove 92 formed in end wall 62 of connector boss 54. Upon selection of a desired angular position between cigar tube 14 and clamp 12, screw 76 is tightened to mesh teeth 86 and 88 together and compress coil spring 90. If it is subsequently desired to change the angular orientation of cigar tube 14 relative to clamp 12, screw 76 is unthreaded only enough to allow coil spring 90 to move teeth 88 on cigar tube 14 out of meshed engagement with teeth 86 on clamp 12. Upon release of meshed engagement, cigar tube 14 can be rotated relative to clamp 12 to a new swivel position whereat screw 76 is retightened to again cause meshed engagement of teeth 88 on cigar tube 14 with teeth 86 on clamp 12. FIG. 5 best illustrates the radial orientation of teeth 88 on connector boss 54 and teeth 86 on connector post 72.

It will be understood that connector post 72 can be associated with cigar tube 14 and connector boss 54 with can be associated with first arm 18 of clamp 12 in accordance with an alternative configuration. The male member (post 72) and female member (boss 54) arrangement of the present disclosure permits swivel adjustment between cigar tube 14 and clamp 12. It will also be appreciated that any number of alternative swivel connector arrangements can be provided between connector boss 54 and connector post 72 that are capable of providing a plurality of distinct swivel positions therebetween. In this regard, FIG. 6 illustrates a plurality of semi-circular lugs 100 extending from the distal end surface of connector post 72' that can be inter-digitated with a plurality of semicircular lugs 102 extending from the end wall of connector boss 54'. Screw 76 and coil spring 90 are again used to provide a releasable biased engagement between meshed lugs 100 and 102.

It is contemplated that the semi-circular lugs on one of connector boss 54' and connector post 72' can be replaced with semicircular notches that are adapted to receive the semicircular lugs formed on the other of connector boss 54' and connector post 72'. Furthermore, the number, size, shape and/or configuration of such lugs and/or notches can include other suitable alternatives which facilitate swivel movement of cigar tube 14 relative to clamp 12. It is also contemplated that a different type of fastener than screw 76 can be used to releaseably locate and maintain cigar tube 14 in a selected swivel position relative to clamp 12. For example, a tension spring assembly can interconnect connector post 72 to connector boss 54 and, upon expansion, releases meshed engagement between the teeth/lugs to permit cigar tube 14 to be rotated relative to clamp 12. Upon release, the teeth/lugs will move back into meshed engagement due to the biasing force applied by the tension spring assembly.

In operation, cigar holder assembly 10 permits a golfer to releaseably mount the assembly to any suitable structural component of a golf bag or a golf cart. Upon attachment of clamp 12 to the structural component, a cigar can be inserted into and retained within cigar tube 14. Golf tee 70 acts as a stop that extends across tube 14 to prevent the cigar from falling out. Golf tee 70 is only an example of the type of stop member that can be used, but is preferable based on the availability of tees on the golf course. Tube 14 can be positioned in virtually any orientation relative to the golf cart, but is contemplated that the open end of tube 14 opposite golf tee 20 is oriented to prevent inadvertent and undesired loss of the cigar therefrom. Based on personal preference, either end (mouth end or light end) of the cigar can be placed into tube 14 to engage golf tee 70.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A cigar holder assembly, comprising:
   a clamp adapted for releasable connection to a structural component of a golf cart;
   a cigar tube having a chamber configured to receive and retain a cigar therein;
   a removable golf tee passing through a first or second aperture in the cigar tube so that the golf tee extends across the cigar tube chamber to a respective first or second aligned position to prevent a cigar from falling out of the cigar tube, the golf tee enabling either end, mouth end or lit end, of the cigar to engage the golf tee, the first or second aperture positioned to be spaced with respect to one another along an axis of the cigar tube, the first or second aperture enabling positioning of the golf tee to enable a user to remove the cigar from the cigar tube; and
   a multi-positional swivel connector interconnecting said cigar tube to said clamp and permitting adjustment of the rotational position of said cigar tube relative to said clamp.

2. The cigar holder assembly of claim 1 wherein said swivel connector includes a male member extending from one of said cigar tube and said clamp, a female member extending from the other of said cigar tube and said clamp, and a fastener, wherein said female member surrounds said male member to define a rotary axis about which the rotational position of said cigar tube can be adjusted relative to said clamp and said fastener releaseably couples said female member to said male member.

3. The cigar holder assembly of claim 2 wherein said swivel connector further includes first projections formed on said male member that are adapted to inter-digitate with or engage second projections formed on said female member.

4. The cigar holder assembly of claim 3 wherein said first projections are a set of first teeth, wherein said second projections are a set of second teeth, and wherein said first teeth are configured to mesh with said second teeth and define a plurality of distinct rotated positions between said cigar tube and said clamp.

5. The cigar holder assembly of claim 3 wherein said first projections are a set of first lugs, wherein said second projections are a set of second lugs, and wherein said first lugs are configured to mesh with said second lugs and define a plurality of distinct rotated positions between said cigar tube and said clamp.

6. The cigar holder assembly of claim 2 wherein said male member is a connector post extending outwardly from said clamp, wherein said female member is a connector boss extending outwardly from said cigar holder and having a tubular portion surrounding said connector post, and wherein said swivel connector further includes a set of first projections formed on said connector post that are configured to meshingly engage with a set of second projections formed on said connector boss, said fastener releaseably connecting said connector boss to said connector post when said first and second projections are meshed.

7. The cigar holder assembly of claim 6 wherein said swivel connector further includes a spring disposed between said first and second projections and which surrounds said fastener.

8. The cigar holder assembly of claim 6 wherein said fastener is a screw adapted to extend through a mounting aperture in said connector boss and threadably engage a threaded bore formed in said connector post.

9. The cigar holder assembly of claim 6 wherein said first projections are a set of first teeth, wherein said second projections are a set of second teeth, and wherein said first teeth are configured to mesh with said second teeth and define a plurality of distinct rotated positions between said cigar tube and said clamp.

10. The cigar holder assembly of claim 6 wherein said first projections are a set of first lugs, wherein said second projections are a set of second lugs, and wherein said first lugs are configured to mesh with said second lugs and define a plurality of distinct rotated positions between said cigar tube and said clamp.

11. A cigar holder assembly, comprising:
    a clamp adapted for releasable connection to a structural component of a golf cart and having a connector post;
    a cigar tube having a chamber configured to receive and retain a cigar, a removable golf tee passing through a first or second aperture in the cigar tube so that the golf tee extends across the cigar tube chamber to a respective first or second aligned position to prevent a cigar from falling out of the cigar tube, the golf tee enabling either end, mouth end or lit end, of the cigar to engage the golf tee, the first or second aperture positioned to be spaced with respect to one another along an axis of the cigar tube, the first or second aperture enabling positioning of the golf tee to enable a user to readily remove the cigar from the cigar tube and a connector boss adapted to surround said connector post so as to define a rotary axis about which the rotational position of said cigar tube can be adjusted relative to said clamp; and
    a swivel connector for positioning and retaining said cigar tube in one of a plurality of rotational positions relative to said clamp, said swivel connector including first projections formed on said connector post which engage second projections formed in said connector boss, and a fastener for securing said connector boss to said connector post.

12. The cigar holder assembly of claim 11 wherein said first projections are a set of first teeth, wherein said second projections are a set of second teeth, and wherein said first teeth are configured to mesh with said second teeth and define a plurality of distinct rotated positions between said cigar tube and said clamp.

13. The cigar holder assembly of claim 11 wherein said first projections are a set of first lugs, wherein said second projections are a set of second lugs, and wherein said first lugs are configured to mesh with said second lugs and define a plurality of distinct rotated positions between said cigar tube and said clamp.

14. The cigar holder assembly of claim 11 wherein said swivel connector further includes a spring disposed between said first and second projections and which surrounds said fastener.

15. The cigar holder assembly of claim 14 wherein said fastener is a screw adapted to extend through a mounting aperture in said connector boss and threadably engage a threaded bore formed in said connector post.

16. A cigar holder assembly, comprising:
    a clamp adapted for releasable connection to a structural component of a golf cart;
    a cigar tube, open at both its ends, having a chamber configured to receive and retain a cigar therein;
    a removable golf tee passing through a first or second aperture in the cigar tube so that the golf tee extends across the cigar tube chamber to a respective first or second aligned position to prevent a cigar from falling out of the cigar tube but enabling passage of air through the cigar tube, the stop enabling either end, mouth end or lit end, of the cigar to engage the stop, the first or second aperture positioned so as to be spaced with respect to one another along an axis of the cigar tube, the first or second aperture enabling positioning of the golf tee to enable a user to readily remove the cigar from the cigar tube; and a multi-positional swivel connector interconnecting said cigar tube to said clamp and permitting adjustment of the rotational position of said cigar tube relative to said clamp, said swivel connector including a male member extending from one of said cigar tube and said clamp, a female member extending from the other of said cigar tube and said clamp, and a fastener releaseably coupling said female member to said male member, said female member surrounds said male member to define a rotary axis about which the rotational position of said cigar tube can be adjusted relative to said clamp and said swivel connector further including first projections formed on said male member that are adapted to inter-digitate with or engage second projections formed on said female member.

* * * * *